Jan. 15, 1963
H. F. MAY
3,073,188
DRILL LOCATION JIG
Filed Nov. 13, 1961
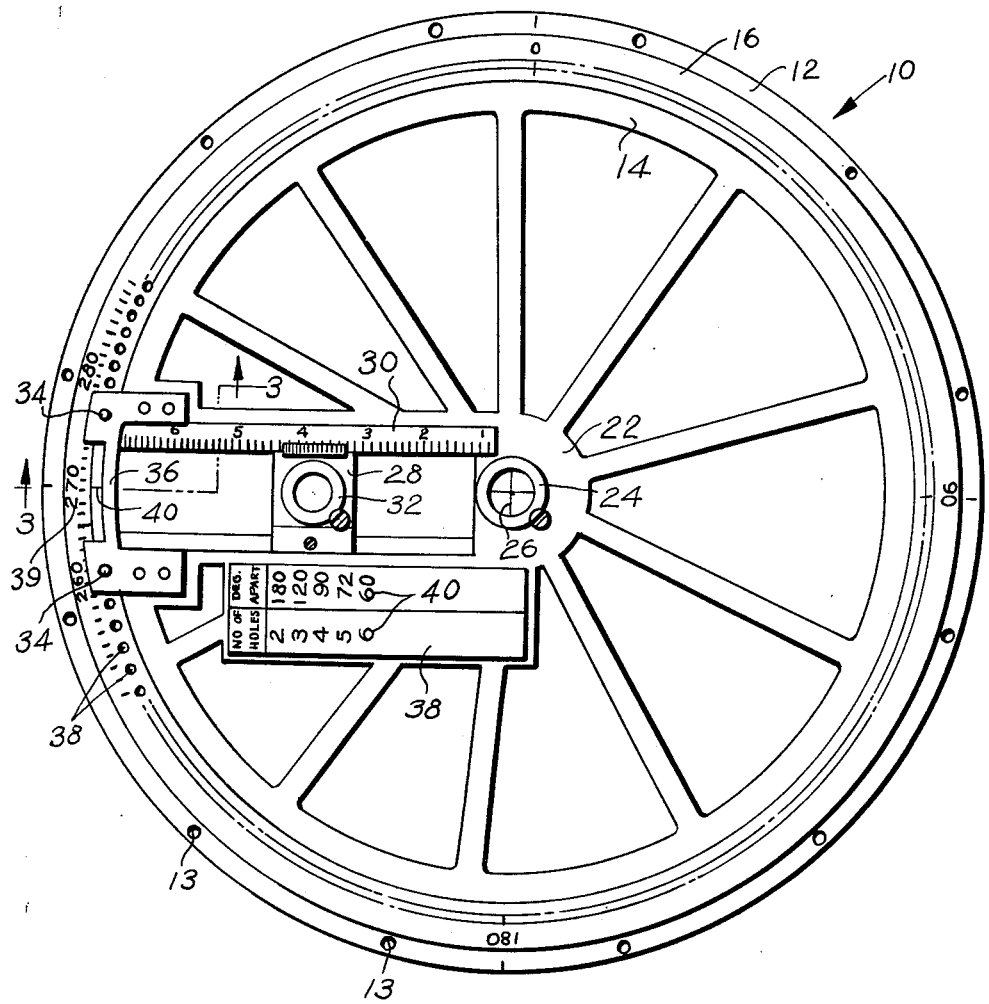
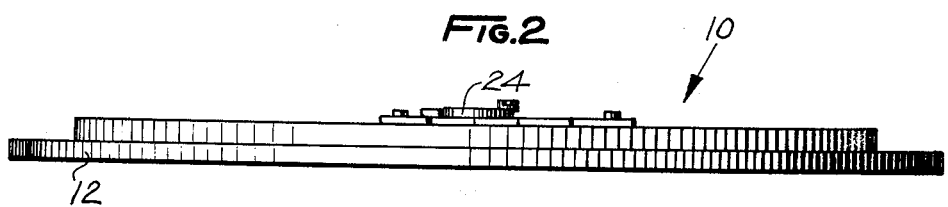
INVENTOR.
HARRY F. MAY

United States Patent Office 3,073,188
Patented Jan. 15, 1963

3,073,188
DRILL LOCATION JIG
Harry F. May, Denver, Colo. (P.O. Box 32, Westminster, Colo.)
Filed Nov. 13, 1961, Ser. No. 151,638
2 Claims. (Cl. 77—62)

This invention relates to machine tools and, more particularly, to an indexing device therefor.

It is an object of the present invention to provide a drill location jig which can be conveniently used for positioning a drill in a selected number of positions around a reference point in a simple and convenient manner.

Still another object of the present invention is to provide a drill location jig of the above type which can be readily mounted upon any flat surface by either bolting or clamping, can be used to accurately locate the jig relative to the center of the hole circle, and which will facilitate the indexing of the bushing thereof for drilling a plurality of holes around the reference point.

Other objects of the invention are to provide a drill location jig bearing the above objects in mind, which is of simple construction, has a minimum number of parts, is inexpensive to manufacture, and efficient in operation.

For other objects and for a better understanding of the invention, reference may be had to the following detailed description, taken in conjunction with the accompanying drawing, in which:

FIGURE 1 is a top plan view of a drill location jig assembly made in accordance with the present invention;

FIGURE 2 is a side elevational view of the jig shown in FIGURE 1; and

FIGURE 3 is a fragmentary cross sectional view taken along line 3—3 of FIGURE 1.

Referring now more in detail to the drawing, a drill location jig 10 made in accordance with the present invention is shown to include a substantially annular base plate 12 having apertures 13 for facilitating the clamping or other type of mounting thereof upon a flat surface. A second member 14 is rotatably mounted upon the base member 12 for selective rotation relative thereto and is provided with an overlying reference plate 16 having a plurality of circumferentially spaced apart apertures 38 each identified by a protractor scale 39. A bottom plate 18 secured to the second member 14 by means of screws 20, is removable to facilitate the assembly and disassembly of the second member relative to the base member.

The hub 22 of the second member 14 is provided with a centrally located cross hair bushing 24, having cross hairs 26 which may be centered over a reference point on the workpiece. A slide 28 slidably mounted for radial movement relative to the hub 22, adjacent to a scale 30, is provided with a drill bushing 32 and releasable lock means for securing the slide 28 at any position along the length of the scale 30.

A bridge 36 secured to the second member 14 has a radially outwardly facing cutout portion with a reference line 40 for reading the scale 39 during use. A pad 38 mounted upon the second member 14 has means for placing reference indicia 40 for determining the spacing between the predetermined number of holes to be drilled around the reference point defined by the cross hairs 26.

In actual use, it will now be recognized that the device may be clamped upon the workpiece with the cross hairs 26 over the prescribed reference point. By removing the stop pins 34 which are receivable at their lower ends within the indents 38 in the ring 16, the second member 14 may be rotated to a selected angular position as identified by the protractor scale 39, at which point the pins 34 are replaced locking the second member 14 in the rotationally adjusted position. The slide 28 is then moved to the selected radial position relative to the reference cross hairs 26 and clamped in place, whereupon a hole may be drilled by means of the guide bushing 32. Then, simply by indexing the second member 14 rotationally within the base member 12, as prescribed by the indicia 40 of the instruction sheet 38, the selected number of holes may be conveniently drilled around a circle coaxially with the cross hairs 26.

As this device is very easy to operate, its advantages are numerous, and may be used for all types of production work.

While various changes may be made in the detail construction, it shall be understood that such changes shall be within the spirit and scope of the present invention as defined by the appended claims.

What I claim as new and desire to protect by Letters Patent of the United States is:

1. A drill location jig comprising, in combination, a first base member having mounting means, a second member rotatably carried by said base member, stop means releasably securing said second member in a selected rotated position relative to said base member, guide means for centering said second member over a reference point, and a bushing adjustably carried upon said second member for sequential rotation within said second member coaxially with said guide means, said first base member comprising a substantially angular plate having means for securing engagement upon a flat surface, said second member comprising a circular wheel rotatably mounted within said first base member, said stop means comprising a plurality of circumferentially spaced apart indents formed in an singular, circular row in said base member, each of said indents being identified by a protractor scale and at least a singular retractable pin carried by said second member for selective releasable engagement with selected ones of said indents.

2. The combination according to claim 1, wherein said guide means comprises a bushing having a pair of perpendicularly intersecting cross hairs secured centrally upon said second member coaxially with said first member, and said bushing adjustably carried upon said second member is slidable radially thereof relative to said cross hair bushing for guiding a drill bit into said workpiece a selected distance away from said cross hairs.

References Cited in the file of this patent
UNITED STATES PATENTS

| | | |
|---|---|---|
| 1,258,137 | Neth | Mar. 5, 1918 |
| 2,373,918 | Schoeniger | Apr. 17, 1945 |
| 2,467,396 | Luisi | Apr. 19, 1949 |
| 2,844,977 | Morse | July 29, 1958 |

FOREIGN PATENTS

| | | |
|---|---|---|
| 793,954 | Great Britain | Apr. 23, 1958 |